United States Patent
Dahl

[19]

[11] Patent Number: 6,043,470
[45] Date of Patent: Mar. 28, 2000

[54] ENERGY CONVERTER FOR ELECTROMAGNETIC INDUCTION HEATING UNITS FOR FOODSTUFFS

[75] Inventor: Jan E. Dahl, Fredericia, Denmark

[73] Assignee: Aktiebolaget Electrlux, Stockhlom, Sweden

[21] Appl. No.: 08/997,945

[22] Filed: Dec. 24, 1997

Related U.S. Application Data

[63] Continuation of application No. 08/693,091, filed as application No. PCT/DK95/00064, Feb. 10, 1995, abandoned.

[30] Foreign Application Priority Data

Feb. 10, 1994 [DK] Denmark ................................. 0174/94

[51] Int. Cl.[7] ................................. H05B 6/12; H05B 6/08
[52] U.S. Cl. ........................... 219/661; 219/665; 219/626; 363/97
[58] Field of Search ................................. 219/661, 663, 219/664, 665, 666, 667, 626, 627; 363/95, 97

[56] References Cited

U.S. PATENT DOCUMENTS

| | | | |
|---|---|---|---|
| 3,466,528 | 9/1969 | Adams | 219/661 |
| 4,426,564 | 1/1984 | Steigerwald et al. | 219/661 |
| 4,900,887 | 2/1990 | Keller | 219/666 |
| 5,354,971 | 10/1994 | Chen | 219/661 |

FOREIGN PATENT DOCUMENTS

0 054 445  6/1982  European Pat. Off. .

*Primary Examiner*—Philip H. Leung
*Attorney, Agent, or Firm*—Sixbey, Friedman, Leedom & Ferguson; David S. Safran

[57] ABSTRACT

For use in the heating of foodstuffs by induction, use is made of an energy converter between energy taken from the mains supply via a rectifier and a high frequency oscillation. Such a converter is frequently based on the maintenance of an oscillation in a parallel resonant circuit (CR, LR) which may be disposed in a converter bridge (S1, S2, S3, S4) of controlled switches. It has turned out to enhance the efficiency considerably to let the parallel resonant circuit be series connected to a self-inductance L1 which connects it to the DC source UDC. A series resonant circuit is thereby created which is active during supply of energy and which in a simple fashion reduces the load on the participating switches.

10 Claims, 1 Drawing Sheet

ENERGY CONVERTER FOR ELECTROMAGNETIC INDUCTION HEATING UNITS FOR FOODSTUFFS

RELATED APPLICATION DATA

This application is a continuation of application Ser. No. 08/693,091 filed on Oct. 1, 1996, now abandoned, which is a 371 of PCT/DK95/00064 filed on Feb. 10, 1995.

BACKGROUND OF THE INVENTION

1. Field of the Invention

The invention relates to an energy converter for use In conjunction with heating units for foodstuffs, comprising a first self-inductance which acts as frequency determining element in a parallel resonating circuit and furthermore as the primary winding in a transformer for transmission of the energy.

2. Description of the Related Art

It is known to heat foodstuffs by induction heating of the cooking vessel. For this a source of high frequency energy is connected to a coil which couples the energy to the cooking vessel which contains the food. The energy is given off as lines in the bottom of the vessel which has a certain conductivity and is furthermore ferromagnetic so that the lines of force run partly in the material of the vessel, partly contribute hysteresis losses. The construction may be regarded as a transformer with the oil as the primary winding and the cooking vessel as a secondary winding or energy converter which is loaded near short circuit. By a different lay-out of the component similar circuits may be used in a baking oven where a closed volume envelopes the food and the energy converters while the primary winding remains outside.

When constructing an induction heating unit for food for use in the home it is essential that there is a high efficiency for the conversion of the energy from the mains into high frequency energy since a low efficiency causes losses and hence development of heat in other places than at the cooking vessel where it is required. This development of heat occurs predominantly in coils and semiconductors, and the compact construction of equipment which is required today results in difficulties in removing the developed heat. Several principles for converting the energy may be used, e.g. an oscillator, the output signal of which is amplified in an otherwise linear amplifier or a self-oscillating power oscillator. It has turned out that the latter usually provides the best efficiency.

The distortion in the generated high frequency oscillation must be low because radiation of harmonics may be avoided, which might otherwise cause electromagnetic interference which because of the higher frequency might be annoying. Furthermore higher frequency components would escape more easily as radiation from the energy transferring transformer which are conditions which are regulated by precise health provisions and where higher frequencies are evaluated harder. A requirement for low distortion means in the case of an oscillator that either the oscillating circuit must have low losses, i.e. a high Q value, or else the feed of energy must occur in such a way that only transients which can be filtered by the resonant circuit are generated. Certain energy conversion methods entail a distortion of the current which, however, does not give any problems in practice as regards the output current, unless semiconductor elements are controlled to break the current at a value different from zero which causes a noise radiation rearwards on the mains.

In order to convert mains frequency energy to high frequency energy a first step is to use a rectifier circuit which is usually of a type using both half-periods. As the second step active components may participate to feed energy into the resonant circuit in a so-called inverter circuit. Such active components should for reasons of reliability not be loaded too close to their maximum performance.

SUMMARY OF THE INVENTION

It is the purpose of the invention to provide a conversion circuit of the kind referred to above which displays a good efficiency and purity of oscillation and which enables the use of components which are not subjected to large but brief excess voltages and excess currents. Furthermore it is a purpose to provide a circuit which is intrinsically safe in that no high frequency energy is generated in case the energy converter has no load.

This is obtained in a construction which is particular in that it furthermore comprises a second self-inductance which together with the components of the resonant circuit establish a series resonant circuit, the resonant frequency of which is higher or equal to the resonant frequency for the parallel resonant circuit. Such a construction will in the following be termed a hybrid resonant circuit. It utilizes the advantage of the use of a parallel resonant circuit which establishes an oscillating system without its currents having to run through the lossy semiconductor components of the inverter and the advantage of a series resonant circuit which does not subject the inverter semiconductor components to a high starting current during the feeding of energy, and furthermore the possibility of stopping the feeding of energy in a zero crossing of the current.

In an embodiment of the invention the other self inductance is placed outside the inverter. This has the advantage that the same self induction which during normal functioning takes care of temporally correct feeding of energy into the parallel resonant circuit, will act as a current limiter in case of a short circuit so that both the rectifier and the inverter circuit are protected at least until an electronic monitoring system or a fuse can break the connection to the mains.

In an advantageous embodiment the inverter is of a type which feeds energy into the parallel resonant circuit during both half periods. Hence the energy supply becomes more even, in that the individual current pulse is reduced in comparison to a configuration using only one switch.

In a preferred embodiment the inverter is constructed fully symmetrical, in that a first set of opposite switches in a bridge conduct in part of a first half period and a second set of opposite switches conduct in part of the second half period, in that the parallel resonant circuit participates as the bridge diagonal. Thus the possibility is obtained of the maximum driving voltage for a given mains voltage.

In a further advantageous embodiment the second self inductance is fitted in series with the parallel resonant circuit in the bridge diagonal. In this way it is possible to keep the frequency determining components physically close together. As regards losses there is no difference between this placement of the second self-inductance and the placement described above, since the current from this self-inductance must pass the same number of semiconductor elements in order to feed into the parallel resonant circuit.

In a further embodiment of the invention two or several inverter circuits are connected to the rectified mains voltage, while they may be alternatingly active or simultaneously. Provided a suitable control is provided of the time intervals these circuits load the mains a good efficiency will be obtainable even during simultaneous operation.

In a further advantageous embodiment of the invention there is placed a storage capacitor for the d.c. voltage after the rectifier. When the voltage is maintained at higher mean value, the current becomes less for a given power, whereby undesired resistive losses are reduced. Thereby a simultaneous activity in two or several inverter circuits is also easier to control.

In an advantageous construction according to the invention a ferrite or dust-iron pot core is used for the first self inductance. In this way it is ensured that the losses which load the energy converter predominantly occur in the cooking vessel or the oven cavity which is to be heated. Hereby the difference between the energy absorbed during a no-load condition and during operation is as large as possible at the same time as the radiation is minimised.

In a further advantageous embodiment of the invention the energy uptake is measured by measurement of the current which is fed into the resonant circuit. In this manner a possibility is established for switching off the energy supply in case the heating unit is not loaded, and in this way unwanted radiation is avoided.

In a further advantageous embodiment of the invention characteristic properties of the current in the parallel resonant circuit (frequency, maximum value, or the like) are measured, whereby input signals are obtained for the control circuit's evaluation of the type of load or suitability, e.g. wrong type of cooking pot material for an efficient energy transfer.

BRIEF DESCRIPTION OF THE DRAWINGS

The invention will be described in greater detail in the following with reference to the drawing, in which.

DETAILED DESCRIPTION OF THE PREFERRED EMBODIMENTS

Figure 1:
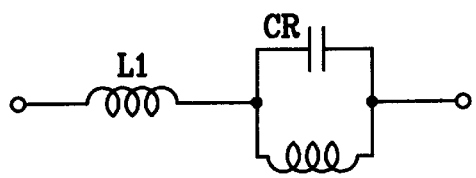
FIG. 1 shows a diagram in schematic form for a hybrid resonant circuit according to the invention.

In FIG. 1 is shown a parallel resonant circuit consisting of a capacitor CR connected in parallel to a self inductance LR which in its turn is series connected to a self inductance L1. CR and LR define an eigenresonance for the parallel resonant circuit. As LR is under load in connection with a heating apparatus for foodstuffs, there are losses in the parallel resonant circuit, and it has to have energy supplied in order to continue oscillating and hence to deliver energy at the resonance frequency. This energy must in a known manner be fed in the correct phase, while it must simultaneously be avoided that a large overcurrent occurs through the semiconductor elements which are used in practice to couple the parallel resonant circuit to the D.C. supply. To this end use is made of the property of L1 that by suitable dimensioning, which will not pose a difficulty to the person skilled in the art, it creates a series resonant circuit with in particular the capacitor CR at preferably a higher frequency than that of the parallel resonant circuit. This series resonance does not have time to develop to a complete oscillation but it influences the way in which the current in the self-inductance L1 increases from zero which is the same as to say that the temporal development of the feed current pulse to the parallel resonant circuit has been controlled. By simple physical means a control of the pulse shape has been obtained which might otherwise only have been achieved by complex pulse shaping circuits.

Figure 2A:
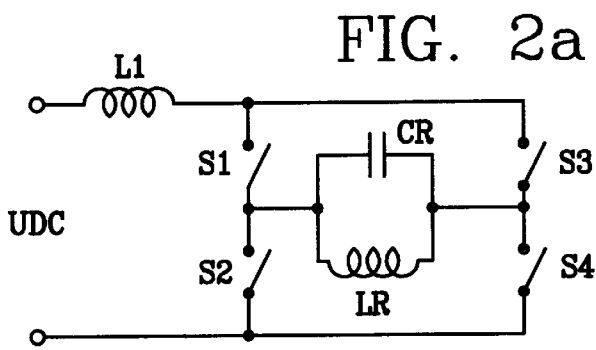
FIG. 2 shows two examples of a hybrid resonance converter, i.e. inverters which use a hybrid resonant circuit.

In FIG. 2a is shown a hybrid resonance converter in the form of a hybrid resonant circuit which is part of a controlled switch bridge of the type called a full bridge. This type is intended for feeding energy to the parallel resonant circuit in each half period, for which reason the feed current pulse must be of opposite polarity in subsequent half periods. This is obtained by letting either switches S1, S4 or switches S2, S3 be conducting while the others are cut off. In case S1, S2 or S3, S4 should conduct simultaneously a short circuit current would be carried by them which is harmful. However, the structure according to FIG. 2a will prevent this, because the self-inductance L1 will limit the speed with which the current increases so that electronic protection devices which are not shown may cut the supply voltage UDC.

Figure 2B:
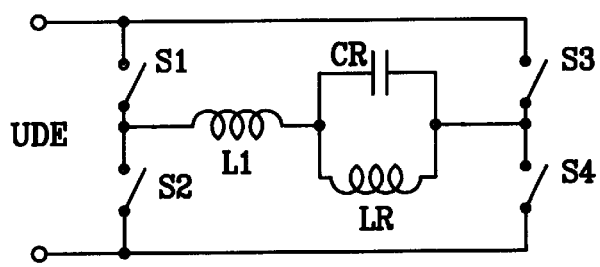

In FIG. 2b is shown a construction which does not display current limiting but functions the same way as regards the feeding of energy. The advantage of this construction is that the semiconductor components may be specified to a lower reverse voltage, because the type of operation causes L1 to create an opposing voltage.

Figure 3:
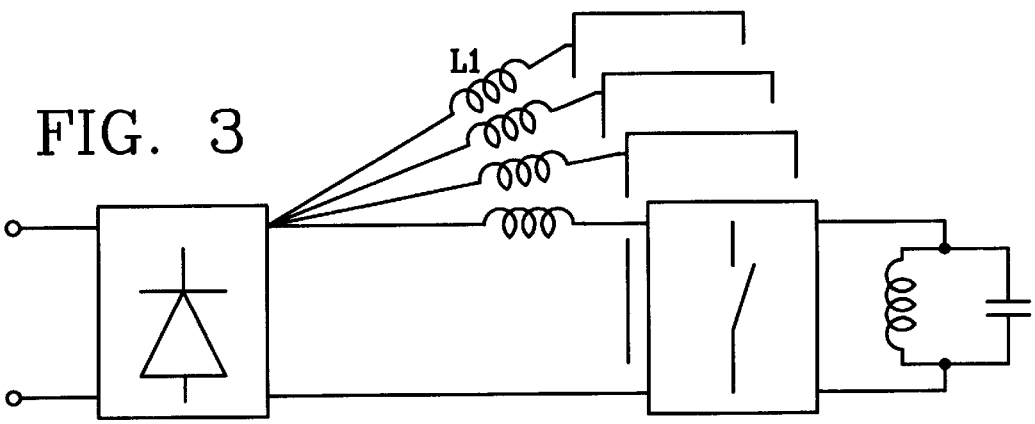
FIG. 3 shows a number of resonant converters connected in parallel to a common D.C. connection.
Figure 4:
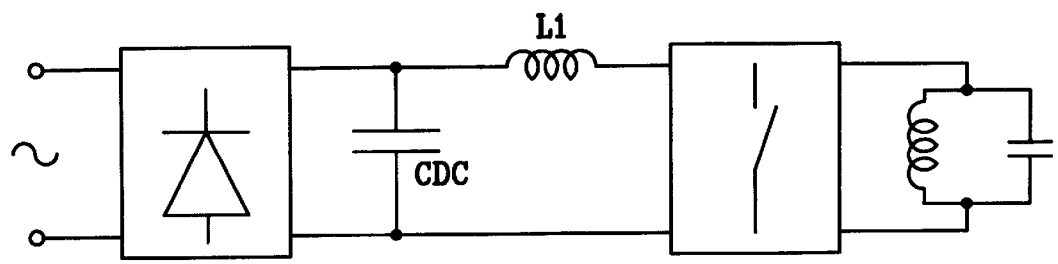
FIG. 4 shows a resonant converter circuit with a smoothing capacitor in the D.C. supply section.

In FIG. 3 is shown a number of hybrid resonance converters of the type shown in FIG. 2a connected in parallel. These may e.g. in the same installation supply a number of cooking plates simultaneously with a number of heating elements in a baking oven being active. In this case the switches S1, S2, S3, S4 have been replaced by a schematic block, and it is seen that the parallel connection occurs so that there is an individual series self-inductance L1a, L1b, . . . L1n to each parallel resonant circuit. The individual hybrid resonance converters would have somewhat different working frequencies but it will in practice not be a problem for the D.C. supply. It is possible to use a charging capacitor as shown in FIG. 4, but it may be omitted, instead it is required that the voltage of the rectifier is above a minimum value when it is required to deliver current. In double rectification of a single phase mains supply the voltage will briefly fall to zero twice per period of the mains frequency, and it hence is simple to control the switches S1, S2, S3, S4 in such a way that they do not attempt connection to the hybrid resonance converter, unless the voltage is above e.g. 100 V in those cases where a peak voltage for the mains is 400 V. Such a control may be carried out either synchronously with the mains or merely be detection of the value of the rectivied mains voltage. In case of a three-phase mains supply the well-known sixtuplet rectification will provide a voltage which does not fall to zero.

In case the practical construction makes use of a charging capacitor as shown in FIG. 4, there will be an initial current surge. This may be avoided by letting the rectifying elements be controlled rectifiers which perform a controlled switch-on procedure. In case no charging capacitor as shown in FIG. 4 is used, the load on the mains will appear purely ohmic, and hence there is no need for a slower switch-on function. There will similarly be no need for phase compensating means. Frequently a mains noise filter will be needed for reasons of noise transmission on the mains.

In order to obtain a good coupling to the energy transmitting element it will be an advantage to use a pot core as the core for the self-inductance LR. Such a core will be formed as a ring-shaped ditch in which the winding is placed and with a central leg and a surrounding ring, while all magnetic parts are made in a ferrite material or a material similar to ferrite. The essential thing here is that the eddy current losses in the core are low. Due to the good coupling there is a possibility that a measurement of the characteristic values of the currents and voltages which appear in the parallel resonant circuit (frequency, amplitude, waveshape) may provide information on missing or incorrect placement of a cooking pot, or a pot of the wrong material, e.g. the lack of ferromagnetic material. Measurement of the current in the series resonant circuit may similarly be used as input values for safety circuits.

I claim:

1. An energy converter for use in conjunction with heating units for foodstuffs, comprising an inverter, a first self-inductance which acts as a frequency determining element in a parallel resonant circuit coupled to the inverter and furthermore as the primary winding in a transformer for transmission of the energy to a cooking vessel which acts as the secondary winding in the transformer, a second self-inductance which, together with the components of the resonant circuit, establish a series resonant circuit, the resonant frequency of the series resonant circuit is higher or equal to the resonant frequency for the parallel resonant circuit.

2. An energy converter according to claim 1, characterized in that the second self inductance is placed outside the inverter.

3. An energy converter according to claim 1, characterized in, that the inverter is of a type which feeds energy into the parallel resonant circuit during both half periods.

4. An energy converter according to claim 1, characterized in that the inverter is constructed fully symmetrical, in that a first set of opposite switches in a bridge conduct in part of a first half period and a second set of opposite switches in the bridge conduct in part of the second half period, and in that the parallel resonant circuit participates as the bridge diagonal.

5. An energy converter according to claim 1, characterized in, that the second self inductance is fitted in series with the parallel resonant circuit in the bridge diagonal.

6. An energy converter according to claim 1, characterized in that two or several inverter circuits are connected to a rectified mains voltage and are alternatingly active or simultaneously active.

7. An energy converter according to claim 1, characterized in that there is placed a storage capacitor for the d.c. voltage after the rectifier.

8. An energy converter according to claim 1, characterized in, that a ferrite or dust-iron pot core is used for the first self inductance.

9. An energy converter according to claim 1, characterized in, that the energy uptake is measured by measurement of the current which is fed into the resonant circuit.

10. An energy converter according to claim 1, characterized in that means for measuring characteristic properties of the current in the parallel resonant circuit give input signals for a control circuit for evaluation of the type or suitability of the load.

* * * * *